United States Patent [19]

Sakamoto et al.

[11] Patent Number: 4,880,703

[45] Date of Patent: Nov. 14, 1989

[54] ACICULAR ELECTROCONDUCTIVE TITANIUM OXIDE AND PROCESS FOR PRODUCING SAME

[75] Inventors: Masashi Sakamoto; Haruo Okuda; Hideo Takahashi; Eiji Yamada, all of Yokkaichi, Japan

[73] Assignee: Ishihara Sangyo Kaisha, Ltd., Osaka, Japan

[21] Appl. No.: 118,037

[22] Filed: Nov. 9, 1987

[30] Foreign Application Priority Data

Nov. 11, 1986 [JP] Japan .................................. 61-268084

[51] Int. Cl.$^4$ ............................................... D02G 3/00
[52] U.S. Cl. .................................... 428/378; 252/518; 427/215; 428/364; 428/375; 428/379; 428/397; 428/401; 428/403; 428/404
[58] Field of Search ............... 428/364, 375, 378, 397, 428/379, 401, 403, 404; 252/518; 427/215

[56] References Cited

U.S. PATENT DOCUMENTS 3,579,310  5/1971  Lewis ...................................... 23/301
4,373,013  2/1983  Yoshizumi ........................... 428/403
4,420,534 12/1983  Matsui et al. ........................ 428/373
4,431,764  2/1984  Yoshizumi ........................... 524/410
4,452,830  6/1984  Yoshizumi ........................... 427/215
4,457,973  7/1984  Matsui et al. ........................ 428/374
4,568,609  2/1986  Sato et al. ............................ 428/406
4,655,966  4/1987  Guillaumon et al. ............... 524/410

FOREIGN PATENT DOCUMENTS 2088348 11/1981 United Kingdom .

OTHER PUBLICATIONS

Patent Abstracts of Japan, vol. 9, No. 134, Jun. 8, 1985, p. 60, C 285.
Patent Abstracts of Japan, vol. 5, No. 191, Dec. 5, 1981, pp. 80, 92.

Primary Examiner—George F. Lesmes
Assistant Examiner—James B. Monroe, II
Attorney, Agent, or Firm—Cushman, Darby & Cushman

[57] ABSTRACT

Disclosed in an electroconductive titanium oxide very low in powder resistivity and imparting superior electroconductivity when incorporated into a resin which comprises an acicular titanium oxide of at most 3% by weight in impurity content which has on the surface an electroconductive layer comprising tin oxide and antimony oxide.

1 Claim, No Drawings

ACICULAR ELECTROCONDUCTIVE TITANIUM OXIDE AND PROCESS FOR PRODUCING SAME

BACKGROUND OF THE INVENTION

This invention relates to an acicular electroconductive titanium oxide having on the surface an electroconductive layer comprising tin oxide and antimony oxide and a process for producing it. Acicular electroconductive titanium oxide is useful as electrical conductivity-imparting agent or antistatic agent for plastics, rubbers, fibers, etc. and electrical conductivity-imparting agent for support of recording materials such as electrophotographic copying paper and electrostatic recording paper.

As electrical conductivity-imparting agents, there have been known antimony-containing tin oxide powder, conductive powder comprising titanium dioxide powder having on its surface an electroconductive layer comprising tin oxide or tin oxide and antimony oxide and the like (U.S. Pat. Nos. 4,373,013 and 4,452,830). Recently, an electroconductive material mainly composed of fibrous potassium titanate coated on the surface with tin oxide has been proposed in Japanese Patent Examined Publication (Kokoku) No. 26933/86.

Generally speaking, electrical conductivity-imparting agents of an acicular form (including fibrous form), as compared with spherical form, and furthermore the agents which are lower in their powder resistivity, namely, higher in electrical conductivity, can give resin articles and rubber articles of the desired conductivity even with the addition thereof in a small amount to the article. Commercially available antimony-containing tin oxide powder and electroconductive powder comprising titanium dioxide having on the surface an electroconductive layer comprising tin oxide and antimony oxide have its own powder resistivity of 1-10 $\Omega$cm which shows very excellent electrical conductivity, but since they are in the form of spherical powder, they must be added in an amount of more than 50% to the media such as resin and rubber in order to impart the desired conductivity to the media. Addition of them in such a large amount causes reduction in strength of articles such as electroconductive resins and electroconductive rubbers and besides it is not economical.

As an approach to solve these problems, there has been recently proposed, for example, a white conductive material comprising fibrous potassium titanate coated on its surface with an electroconductive layer of tin oxide. This is satisfactory on the point of shape, but is high in powder resistivity and poor in strength and, therefore, the material is still not satisfactory in this respect. Even if the composition of the electroconductive layer is changed to that of tin oxide and antimony oxide, powder resistivity obtained is at most about 50-100 $\Omega$cm due to the influence of potassium component.

Noticing the superiority of acicular electroconductive materials as electrical conductivity imparting agent; the inventors have attempted to coat the surface of acicular titanium oxide as a substrate material with an electroconductive layer. As a result, the following have been found and this invention has been accomplished.
(a) The known acicular titanium oxide obtained by conventional methods inevitably contains impurities such as alkali metals, alkaline earth metals and phosphorus compounds which come from starting materials and which cannot be removed by such means as water leaching. (b) When an electroconductive layer is coated on the titanium oxide in which the impurities remain in more than a specific amount, formation of the coating layer on the surface of titanium oxide is difficult or even if the electroconductive layer can be formed, good conductivity cannot be obtained. (c) These impurities can be removed by acid treatment and/or alkali treatment.

SUMMARY OF THE INVENTION

That is, this invention relates to an acicular electroconductive titanium oxide which comprises a titanium oxide having a length of 1-10 $\mu$m and an aspect ratio of 3 or higher and containing at most 3% by weight of impurities which has on its surface an electroconductive layer comprising tin oxide and antimony oxide and further relates to a process for producing an acicular electroconductive titanium oxide which comprises treating an acicular titanium oxide having a length of 1-10 $\mu$m and an aspect ratio of 3 or higher with an acid and/or an alkali to produce a titanium oxide having an impurity content of at most 3% by weight, then forming on the surface a coating layer comprising hydrates of tin oxide and antimony oxide and then subjecting the product to separation and calcination.

In this invention, the "acicular" titanium oxide includes fibrous, rod-like, columnar and other similarly-shaped titanium oxides as well as acicular titanium oxide.

The acicular electroconductive titanium oxide of this invention comprises a titanium oxide having a ratio of length and diameter (aspect ratio) of at least 3, preferably at least 10 as a substrate material which has an electroconductive layer comprising tin oxide and antimony oxide on the surface. The acicular titanium oxide which is a substrate is that which contains impurity in an amount of at most 3% by weight in terms of anhydride, namely, is of at least 97%, preferably at least 98% in $TiO_2$ purity. It is especially important that the content of a phosphorus compound as an impurity is at most 1% by weight, desirably at most 0.5% by weight in terms of $P_2O_5$ and the content of compound of metals having a valence of 3 or less such as sodium, potassium, zinc, aluminum or the like is at most 0.2% by weight, desirably 0.1% by weight in terms of oxide. When the content of a phosphorus compound is higher than said range, the electroconductive layer on the substrate material is in the form of discontinuous film and this is not preferred. When the content of a compound of metal having a valence of 3 or less is higher than said range, a continuous and uniform electroconductive layer is produced, but acicular electroconductive titanium oxide of desired electrical conductivity is difficult to obtain. The electroconductive layer formed on substrate material has a structure comprising tin oxide in which antimony is doped and thus comprises substantially tin oxide and antimony oxide. The amount of tin oxide in an electroconductive layer is 1-50% by weight, preferably 5-30% by weight of the substrate as $SnO_2$. If it is smaller than said range, the formation of a continuous electroconductive layer becomes difficult and the desired conductivity cannot be obtained. If it is more than said range, improvement in conductivity with increase in the amount cannot be expected and so this is not economical. The amount of antimony oxide in conductive layer is 5-30% by weight, preferably 10-25% by weight of tin oxide ($SnO_2$) as $Sb_2O_3$. If it is less than said range, the desired conductivity is difficult to obtain and if it is more than said range, conductivity decreases or strong coloration with antimony oxide occurs and thus this is not preferred.

The acicular electroconductive titanium oxide of this invention can provide high electrical conductivity with addition in a smaller amount to resin binder than conventional spherical electroconductive powder and so it is very economical. Furthermore, because of such addition in a smaller amount, desired electroconductive plastics and paints can be obtained without causing reduction of strength of binder. Moreover, in the case of electroconductive paints of high concentration, even a thin coat film can have the desired conductivity. Especially, since the electroconductive titanium oxide of this invention has higher strength than fibrous potassium titanate having on the surface an electroconductive layer comprising tin oxide and antimony oxide, it is not easily broken by the load caused at blending and dispersion. Therefore, the inherent acicular property is retained and no separation of the electroconductive layer occurs and thus plastics, paints, fibers and the like which have electrical conductivity stable and less in reduction are obtained.

As mentioned above, since the electroconductive titanium oxide of this invention is acicular and is excellent in strength, not only electrical conductivity can be imparted, but also strength of molded articles, coating films, etc. can be increased by addition of it in a suitable amount to resin binders and thus electroconductive reinforced plastics, electroconductive fibers and electroconductive paints can be made and besides electrostatic recording papers, electrophotographic copying papers, antistatic coating film, etc. can be made by coating thus produced paint on an insulating substrate such as paper to form an electroconductive film light in weight and superior in adhesiveness.

In the process for production of the acicular electroconductive titanium oxide according to this invention, firstly an acicular titanium oxide of 1–10 μm in length and at least 3 in aspect ratio is treated with an acid or alkali to reduce the content of impurities to at most 3% by weight. Especially, the content of a phosphorus compound is adjusted to at most 1% by weight as $P_2O_5$ and the content of a compound of a metal having a valence of 3 or less to at most 0.2% by weight as oxide. Acicular titanium oxide can be obtained, for example, by mixing rutile type $TiO_2$ with an alkali metal salt such as sodium chloride and an oxy-phosphorus compound and then calcining the resulting mixture at 725°–1000° C. as disclosed in U.S. Pat. No. 3,579,310 or by calcining a mixture of $TiO_2$ source, a zinc compound, an alkali metal compound and a phosphoric acid compound as disclosed in Japanese Patent Examined Publication (Kokoku) No. 18370/70. Usually, a soluble salt is removed from the thus obtained acicular titanium oxide by water leaching and the similar means after calcination. However, complete removal is difficult and, for example, acicular titanium oxide obtained by the method of U.S. Pat. No. 3,579,310 normally contains an alkali metal in an amount of 3–4% by weight as oxide and a phosphorus compound in an amount of 4–6% by weight as $P_2O_5$. According to this invention, such impurity-containing acicular titanium oxide is treated with an acid or an alkali to reduce the contents of the phosphorus compound and the compound of a metal having a valence of 3 or less to those as stated above and to increase $TiO_2$ purity to at least 97%. When acicular titanium oxide is obtained as a mixture of long and short titanium oxide, long ones are chosen by classification and the similar treatment.

Suitable acids used in this invention are hydrochloric acid, sulfuric acid, nitric acid, hydrofluoric acid, etc. Ordinarily, these acids are used as 1–50% aqueous solutions. As alkalis, 10–50% aqueous solutions of sodium hydroxide, potassium hydroxide and the like are used. The acid treatment or alkali treatment can be performed by introducing acicular titanium oxide into said acid solution or alkali solution, followed by stirring for 1–3 hours. The stirring may be carried out with heating to 50°–90° C., if necessary. Titanium oxide of desired grade can be obtained by single treatment with an acid or alkali, but higher grade titanium oxide can be obtained more easily by combination of the acid treatment and the alkali treatment.

According to this invention, next the thus obtained acicular titanium oxide is suspended in water and a tin chloride and antimony chloride solution is added to this aqueous suspension to resolve tin chloride and antimony chloride to form a coating layer comprising hydrous or hydrated tin oxide and antimony oxide on the surface of said titanium oxide. When the aqueous hydrochloric acid solution of tin chloride and antimony chloride is used, after addition thereof, neutralization is effected with addition of an aqueous alkali solution to form a coating layer comprising hydrous or hydrated tin oxide and antimony oxide. Desirably, the aqueous alkali solution is added simultaneously with addition of said aqueous hydrochloric acid solution so that the suspension keeps a pH of 2–6 to cause resolution of tin chloride and antimony chloride, thereby to form a coating layer comprising hydrous or hydrated tin oxide and antimony oxide. In the case of using an alcoholic solution or acetone solution of tin chloride and antimony chloride, previously the suspension is heated to 40° C. or higher, preferably 70°–90° C. and then said alcoholic solution or acetone solution is added thereto to cause thermal hydrolysis thereby to form a coating layer comprising hydrous or hydrated tin oxide and antimony oxide.

Suitable concentration of acicular titanium oxide in the suspension is 50–300 g/l, preferably 100–200 g/l. The concentration of tin chloride in the tin chloride and antimony chloride solution is such that necessary for coating tin oxide in an amount of 1–50% by weight, preferably 5–30% by weight of the acicular titanium oxide, as $SnO_2$ and that of antimony chloride is such that necessary for coating antimony oxide in an amount of 5–30% by weight, preferably 10–25% by weight of $SnO_2$, as $Sb_2O_3$.

As an alkali of an aqueous alkali solution used as a neutralizing agent, there may be used, for example, a hydroxide or carbonate of an alkali metal such as sodium hydroxide, potassium hydroxide, sodium carbonate, potassium carbonate, etc. and ammonia.

The thus obtained acicular titanium oxide coated with hydrous or hydrated tin oxide and antimony oxide is subjected to separation and then washing and, if necessary, is dried and thereafter is calcined at a temperature of 400°–800° C., preferably 500°–700° C. to change the hydrous or hydrated tin oxide and antimony oxide to a conductive layer comprising tin oxide and antimony oxide. Thereafter, the thus treated titanium oxide is subjected to usual pulverization to produce acicular conductive titanium oxide. The calcination time varies depending on calcination temperature, but usually 30 minutes–10 hours, preferably 1–3 hours.

This invention will be further explained by the following examples.

Preparation of acicular titanium oxide

Acicular titanium oxide was prepared by the method disclosed in U.S. Pat. No. 3,579,310. That is, 4 parts by weight (as $TiO_2$) of finely-divided hydrous titanium oxide, 4 parts by weight of sodium chloride and 1 part by weight of dibasic sodium phosphate ($Na_2HPO_4 \cdot 2H_2O$) were homogeneously mixed and put in a crucible and calcined at 825° C. for 3 hours in an electric furnace. Then, the calcination product was introduced into water and boiled for 1 hour. Thereafter, the precipitate was collected by filtration and washed to remove soluble salts. The thus obtained acicular titanium oxide had a length of 3–5 μm and a diameter of 0.05–0.07 μm. Analysis showed that the product contained 3.8% by weight of sodium (as $Na_2O$) and 4.4% by weight of phosphorus (as $P_2O_5$) as impurities and had a $TiO_2$ purity of 91.0% by weight.

As finely-divided hydrous titanium dioxide used was a rutile type fine titania obtained by neutralizing an aqueous titanium tetrachloride solution having a concentration of 200 g/l as $TiO_2$ kept at 30° C. with an aqueous hydroxide solution to precipitate a colloidal amorphous hydrous titanium oxide and aging this colloidal hydrous titanium oxide at 70° C. for 5 hours and drying at 120° C.

Preparation of rod-like titanium oxide

Rod-like titanium oxide was prepared by the method disclosed in Japanese Patent Examined Publication (Kokoku) No. 18370/70. That is, to finely-divided hydrous titanium dioxide were added a zinc compound, an alkali metal compound and phosphoric acid compound in the amounts of 1.2% by weight as ZnO, 0.55% by weight as $K_2O$ and 0.5% by weight as $P_2O_5$ based on the weight of titanium content in terms of $TiO_2$, respectively. Then, the mixture was calcined at 900° C. for 1 hour. Thereafter, the calcined product was put in water, boiled for 1 hour, then collected by filtration and washed to remove soluble salts. The thus obtained rod-like titanium oxide had a length of 2–3 μm and a diameter of 0.2–0.3 μm. Analysis showed that this product contained 1.1% by weight of zinc (as ZnO), 0.35% by weight of potassium (as $K_2O$) and 0.45% by weight of phosphorus (as $P_2O_5$) and had a $TiO_2$ purity of 95.7%.

Said finely-divided hydrous titanium dioxide was prepared in the following manner. That is, a titanium sulfate solution was hydrolyzed by a usual method and the obtained titanium dioxide hydrate was collected by filtration and washed with water. To this product was added concentrated aqueous ammonia to neutralize the contained sulfuric acid to adjust a pH to 7. This hydrate was collected by filtration and washed with water to reduce the $H_2SO_4$ content in the hydrate to less than 0.5% by weight. Then, concentrated hydrochloric acid was added to this hydrate from which sulfuric acid was removed to adjust a pH to 2 and to peptize the hydrate to obtain finely-divided titania sol.

EXAMPLE 1

The acicular titanium oxide obtained hereabove was subjected to the following alkali treatment.

Alkali treatment

The acicular titanium oxide was put in water to produce a water suspension, to which was added an aqueous sodium hydroxide solution (200 g/l) to adjust the pH of the system to 13.0. Then, the suspension was heated to 90° C. and stirred for 2 hours and then thereto was added an aqueous hydrochloric acid solution (100 g/l) to adjust the pH of the system to 7.0. Thereafter, the titanium oxide was collected by filtration and washed until specific resistance of filtrate reached 50 μS. The resulting cake was subjected to the following acid treatment.

Acid treatment

The thus obtained cake was again put in water to make a water suspension. To the suspension was added an aqueous hydrochloric acid solution (100 g/l) to adjust the pH of the system to 1.0. The suspension was then heated to 90° C. and stirred for 2 hours. The titanium oxide was collected by filtration and washed until specific resistance of filtrate reached 50 μS.

The thus treated acicular titanium oxide was analyzed to find that it contained 0.01% by weight of sodium (as $Na_2O$) and 0.29% by weight of phosphorus (as $P_2O_5$) and had a TiO purity of 98.5% by weight.

Then, this acicular titanium oxide was put in water to produce a suspension of 100 g/l in concentration and this was heated to 70° C. Then, thereto were added side by side a solution prepared by dissolving 46.5 g of tin chloride ($SnCl_4 \cdot 5H_2O$) and 6.7 g of antimony chloride ($SbCl_3$) in 300 ml of a 6N-aqueous hydrochloric acid solution and a 10% aqueous sodium hydroxide solution over a period of 60 minutes so that the pH of the suspension was kept at 2–3, thereby to form a coating layer comprising hydrous or hydrated tin oxide and antimony oxide on the surface of the acicular titanium oxide. Then, the titanium oxide was collected by filtration and washed until specific resistance of filtrate reached 50 μS. This was dried at 120° C. for 24 hours and calcined at 600° C. for 1 hour in an electric furnace to obtain acicular electroconductive titanium oxide coated with a conductive layer of 16% by weight of Sn as $SnO_2$ and 3.5% by weight of Sb as $Sb_2O_3$.

COMPARATIVE EXAMPLE

Example 1 was repeated except that the alkali treatment and acid treatment were not carried out. Electron micrograph of the thus obtained acicular electroconductive titanium oxide showed that there were a lot of free substances around the substrate acicular titanium oxide and continuous film was not formed.

Test Example 1

Powder resistivities (Ωcm) of the acicular electroconductive titanium oxide obtained in Example 1 and the Comparative Example, commercially available potassium titanate fiber coated with an electroconductive layer comprising tin oxide and antimony oxide (WK-100S manufactured by Otsuka Chemical Co.) as referential sample A and commercially available spherical titanium oxide powder coated with an electroconductive layer comprising tin oxide and antimony oxide (W-1 manufactured by Mitsubishi Metal Co.) as referential sample B were measured by the following method. The results are shown in Table 1.

Measurement of powder resistivity

Sample powder was molded into a columnar powder compact (diameter: 18 mm and thickness: 3 mm) under a pressure of 100 kg/cm². The DC resistance thereof was measured and powder resistivity was calculated from the following formula.

$$\text{Powder resistivity } (\Omega \text{ cm}) = DC \text{ resistance} \times \frac{\text{Sectional area}}{\text{Thickness}}$$

TABLE 1

Powder resistivity

|  |  | (Ω cm) |
|---|---|---|
| Example 1 |  | 10 |
| Comparative Example |  | 5.9 × 10⁴ |
| Referential Samples | A Commercially available electroconductive potassium titanate fiber | 330 |
|  | B Commercially available electroconductive spherical titanium oxide powder | 2 |

TEXT EXAMPLE 2

The electroconductive materials obtained in the above Example 1 and Comparative Example and the referential samples referred to above were blended with a vinyl chloride resin having the following composition at the blending ratios as indicated in Table 2 and each of the resulting blends was kneaded by two-roll mill at 160° C. for 7 minutes. Then, the sheet taken out from mill was molded into a sheet of 10 cm×10 cm×0.1 cm by application of pressure of 100 kg/cm². Electric resistance of this sheet was measured by DIGITAL OHM METER (R-506 manufactured by Kawaguchi Electric Works Co., Ltd.) and volume specific resistance and surface specific resistance were calculated from the following formulas. The results are shown in Tables 2 and 3.

Composition of the vinyl chloride resin

| Vinyl chloride resin (Zeon EP103 produced by Nippon Zeon Co., Ltd.) | 3000 g |
|---|---|
| Plasticizer (D.O.P.) | 90 g |
| Stabilizer (Laurate organic tin, KS-20, produced by Kyodo Chemical Co., Ltd.) | 30 g |
| Stabilizer (Maleate organic tin, M-101D produced by Tokyo Fine Chemical Co., Ltd.) | 90 g |
| Cadmium stearate | 15 g |

$$\text{Volume specific resistance } (\Omega \text{ cm}) = \text{electric resistance} \times \frac{10 \text{ (electrode constant)}}{\text{Thickness (cm)}}$$

$$\text{Surface specific resistance } (\Omega/\square) = \text{electric resistance} \times 50 \text{ (electrode constant)}$$

TABLE 2

(Volume specific resistance)

| Resin composition (Part by weight) | Electroconductive material (Part by weight) | Example 1 (Ω cm) | Comparative Example (Ω cm) | Referential Sample A (Ω cm) | Referential Sample B (Ω cm) |
|---|---|---|---|---|---|
| 100 | 75 | 1.3 × 10¹⁰ | 1.3 × 10¹⁵ | 6.3 × 10¹³ | 3.4 × 10¹³ |
| " | 100 | 8.9 × 10⁸ | — | — | 2.5 × 10¹³ |
| " | 125 | 1.9 × 10⁷ | 9.8 × 10¹³ | 1.7 × 10¹⁰ | 7.9 × 10⁹ |
| " | 150 | 1.0 × 10⁷ | — | — | 1.1 × 10⁹ |

TABLE 3

(Surface specific resistance)

| Resin composition (Part by weight) | Electroconductive material (Part by weight) | Example 1 (Ω/□) | Comparative Example (Ω/□) | Referential Sample A (Ω/□) | Referential Sample B (Ω/□) |
|---|---|---|---|---|---|
| 100 | 75 | 2.3 × 10⁹ | 1.5 × 10¹⁵ | 3.8 × 10¹⁴ | 2.8 × 10¹⁴ |
| " | 100 | 7.5 × 10⁸ | — | — | 1.3 × 10¹⁰ |
| " | 125 | 4.8 × 10⁷ | 6.5 × 10¹³ | 5.3 × 10⁹ | 5.6 × 10⁹ |
| " | 150 | 7.5 × 10⁶ | — | — | 5.5 × 10⁸ |

TEST EXAMPLE 3

12 Grams each of the electroconductive materials of Example 1 and Referential Sample B was mixed with 12 g of deionized water containing 0.5% by weight of sodium hexametaphosphate and 26 g of glass beads and the mixture was put in a paint shaker (#5110 of Red Devil Co.) and shaked for 30 minutes to prepare a mill base.

Then, to each mill base was added polyvinyl alcohol (10 wt % aqueous solution) in such an amount as providing the pigment concentration as shown in Table 4, followed by mixing and stirring to prepare a paint. This paint was coated on an art paper (10 cm×10 cm) at a dry film thickness of 6 μm, left to stand for 1 hour and then dried at 80° C. for 1 hour to prepare a test paper. In the same manner as in Test Example 2, the electric resistance of this test paper was measured and surface specific resistance was calculated therefrom. The results are shown in Table 4.

TABLE 4

| Electro-conductive material | Surface specific resistance (Ω/□) Pigment concentration | | |
|---|---|---|---|
|  | 30 wt % | 50 wt % | 70 wt % |
| Example 1 | 1.4 × 10⁶ | 1.8 × 10⁵ | 4.1 × 10⁴ |
| Referential Sample B | 1.9 × 10¹⁵ | 5.5 × 10⁷ | 2.5 × 10⁵ |

Note:

$$\text{Pigment Concentration (wt \%)} = \frac{\text{Pigment Amount}}{\text{Pigment Amount + Resin Amount}} \times 100$$

TEST EXAMPLE 4

20 Grams each of the electroconductive materials of Example 1 and Referential Sample B was mixed with 30.6 g of acrylic resin (ACRYDIC A-165-45 with solid content of 45 wt % produced by Dainippon Ink & Chemicals Inc.), 16.4 g of a toluene-butanol mixed solution (mixing weight ratio=1:1) and 50 g of glass beads. The mixture was put in a paint shaker (#510 of Red Devil Co.) and shaked for 30 minutes to obtain a mill base.

Then, to each mill base were added said acrylic resin and said toluene-butanol mixed solution in such respective amounts as providing the pigment concentration as shown in Table 5, followed by mixing and stirring to prepare a paint. This paint was coated on an art paper at 20 μm in dry film thickness and air-dried for 40 hours to prepare a test paper. In the same manner as in Test Example 2, electric resistance of this test paper was measured and surface specific resistance was calculated therefrom. The results are shown in Table 5.

TABLE 5

| Electro-conductive material | Surface special resistance ($\Omega/\square$) Pigment concentration | | | |
|---|---|---|---|---|
| | 20 wt % | 30 wt % | 40 wt % | 50 wt % |
| Example 1 | $1.4 \times 10^8$ | $5.5 \times 10^5$ | $1.5 \times 10^5$ | $6.0 \times 10^4$ |
| Referential Sample B | $9.4 \times 10^{13}$ | $9.4 \times 10^{13}$ | $6.5 \times 10^7$ | $7.0 \times 10^5$ |

TEST EXAMPLE 5

57.6 Grams each of the electroconductive materials of Example 1 and Referential Sample B was mixed with 24 g of oil free alkyd resin (BECKOLITE 46-118 with 60 wt % in solid content produced by Dainippon Ink & Chemicals Inc.), 24 g of a mixed solution (mixing weight ratio=2:1) of SOLVESSO #100 (an aromatic organic solvent) and cellosolve acetate and 100 g of glass beads. The mixture was put in a paint shaker and shaked for 20 minutes to prepare a mill base.

Then, to each mill base were added oil free alkyd resin (SUPER-BECKAMINE J-820 with 60% in solid content produced by Dainippon Ink & Chemicals Inc.), oil free alkyd resin (SUPER-BECKAMINE L-105 with 60% in solid content) and a mixed solution (mixing weight ratio=1:1:1) of SOLVESSO #100, cellosolve acetate and n-butanol in such respective amounts as providing the pigment concentration as mentioned in Table 6, followed by mixing and stirring to obtain a paint. This paint was coated on a tin plate at 20 μm in dry film thickness, left to stand for 1 hour and thereafter baked at 220° C. for 10 minutes to obtain a test plate. In the same manner as in Test Example 2, electric resistance was measured and surface specific resistance was calculated therefrom to obtain the results as shown in Table 6.

TABLE 6

| Electro-conductive material | Surface special resistivity ($\Omega/\square$) Pigment Concentration | | |
|---|---|---|---|
| | 20 wt % | 30 wt % | 40 wt % |
| Example 1 | $1.1 \times 10^{13}$ | $8.1 \times 10^7$ | $1.2 \times 10^5$ |
| Referential Sample B | $3.8 \times 10^{15}$ | $3.8 \times 10^{15}$ | $3.8 \times 10^{15}$ |

TEST EXAMPLE 6

Each of the electroconductive materials of Example 1 and Referential Sample B was blended with a polypropylene resin of the following composition at a blending ratio as shown in Table 7 and each of the blends was kneaded by a two roll mill at 180° C. for 15 minutes. Then, the resulting sheet was taken out from the mill and molded into a sheet of 10 cm × 10 cm × 0.1 cm by application of pressure of 100 kg/cm². In the same manner as in Test Example 2, the electric resistance of this sheet was measured and volume specific resistance was calculated therefrom to obtain the results as shown in Table 7.

TABLE 7

| Blending ratio (Part by weight) | | Volume specific resistance ($\Omega$ cm) | |
|---|---|---|---|
| Resin composition | Electro-conductive material | Example 1 | Referential Sample B |
| 100 | 75 | $1.0 \times 10^7$ | $1.0 \times 10^{15}$ |
| 100 | 100 | $5.8 \times 10^5$ | $6.0 \times 10^{10}$ |

EXAMPLE 2

The rod-like titanium oxide obtained in the method mentioned above was subjected to the treatment with a 3% HF solution under stirring for 1 hour at room temperature. The thus treated rod-like titanium oxide was collected by filtration, washed until the specific resistance of filtrate reached 50 μS, and analyzed to find that it contained 0.02% by weight of zinc (as ZnO), 0.01% by weight of potassium (as $K_2O$) and 0.25% by weight of phosphorus (as $P_2O_5$) and had a $TiO_2$ purity of 98.3% by weight.

Then, in the same manner as in Example 1, the surface of the resulting rod-like titanium oxide was coated with an electroconductive layer of containing 16.0% by weight of tin oxide ($SnO_2$) and 3.5% by weight of antimony oxide ($Sb_2O_3$) to obtain a rod-like electroconductive titanium oxide. In the same manner as in Test Example 1, the powder resistivity of this rod-like conductive titanium oxide was measured to obtain 14.5 $\Omega$cm. Further, in the same manner as in Test Example 2, the volume specific speesific resistance and surface specific resistance thereof were measured to obtain the results as shown in Table 8.

TABLE 8

| Resin composition (Part by wt.) | Electro-conductive material (Part by wt.) | Volume specific resistance ($\Omega$ cm) | Surface specific resistance ($\Omega/\square$) |
|---|---|---|---|
| 100 | 75 | $2.5 \times 10^{12}$ | $1.4 \times 10^{12}$ |
| " | 100 | $5.6 \times 10^{10}$ | $2.2 \times 10^{10}$ |
| " | 125 | $1.6 \times 10^9$ | $9.5 \times 10^8$ |
| " | 150 | $1.6 \times 10^8$ | $5.9 \times 10^7$ |

According to this invention, by previously treating an acicular titanium oxide prepared by a conventional method with an acid and/or alkali to remove impurities and to convert it into high-grade titanium oxide, there can be formed an electroconductive layer comprising tin oxide and antimony oxide on the surface of the titanium oxide in the form of a continuous film. Besides, the thus obtained acicular or rod-like electroconductive titanium oxide of this invention is much lower in powder resistivity than potassium titanate fiber coated with an electroconductive layer of tin oxide and antimony oxide and imparts much superior electrical conductivity when incorporated into resin composition.

What is claimed is:

1. An electroconductive titanium oxide which comprises an acicular titanium oxide having a length of 1 to 10 μm and an aspect ratio of 3 or higher, and containing up to 1% by weight of a phosphorus compound as $P_2O_5$ and up to 0.2% by weight of a compound of a metal having a valence of 3 or less as an oxide of the metal, said acicular titanium oxide having on the surface thereof an electroconductive layer comprising tin oxide in an amount of 1 to 50% by weight of the substrate as $SnO_2$, and antimony oxide in an amount of 5 to 30% by weight of the tin oxide as $Sb_2O_3$.

* * * * *